UNITED STATES PATENT OFFICE.

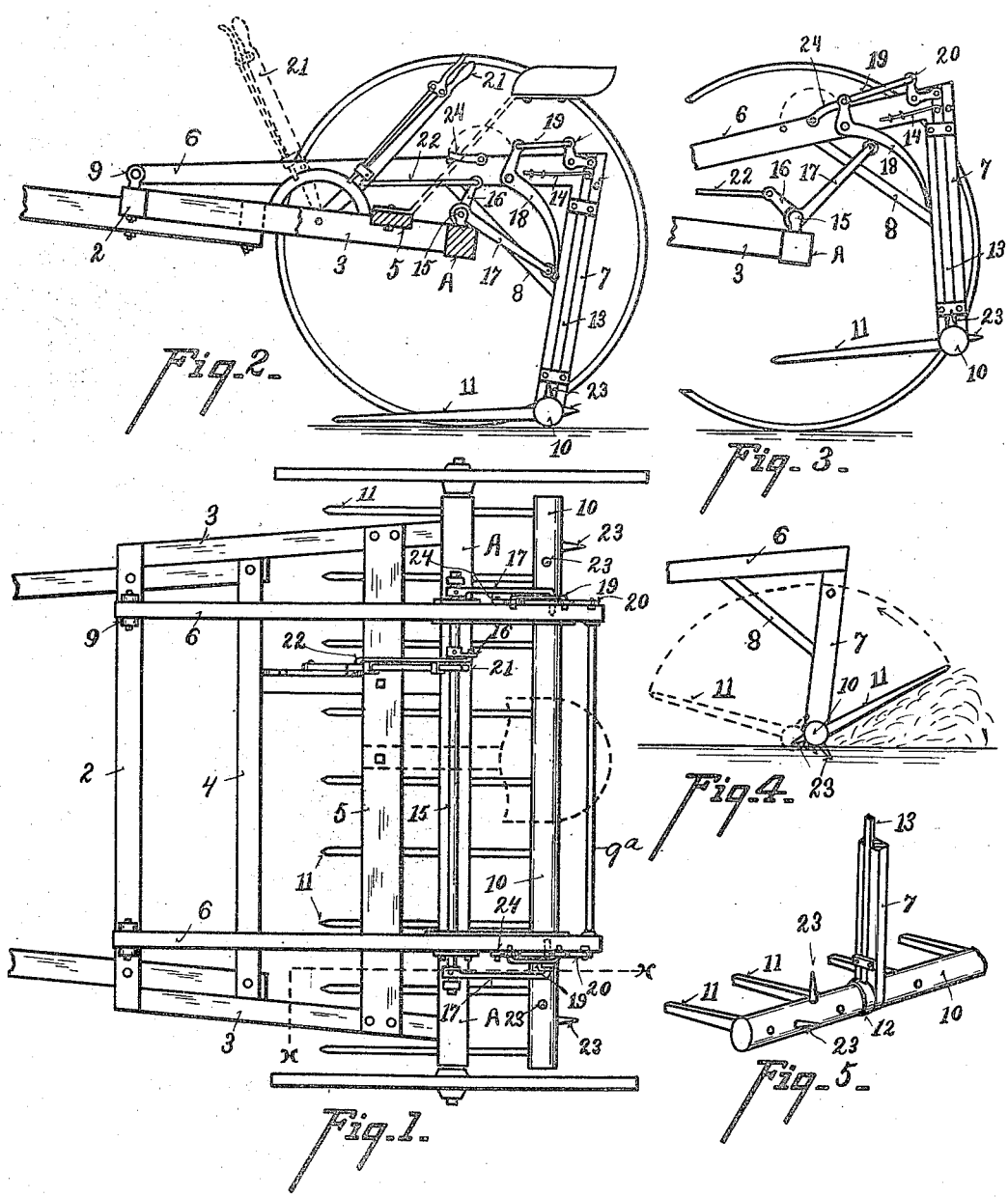

JOHN H. LAWSON, OF DELAWARE, OHIO.

HORSE-RAKE.

SPECIFICATION forming part of Letters Patent No. 668,380, dated February 19, 1901.

Application filed July 7, 1899. Serial No. 723,028. (No model.)

*To all whom it may concern:*

Be it known that I, JOHN H. LAWSON, a citizen of the United States, and a resident of Delaware, in the county of Delaware and State of Ohio, have invented a new and useful Improvement in Horse-Rakes, which improvement is fully set forth in the following specification and accompanying drawings, in which—

Figure 1 is a top plan view of my improved horse-rake. Fig. 2 is a vertical section on line X X of Fig. 1. Figs. 3, 4, and 5 are detail views.

My invention pertains to certain improvements in horse-rakes; and my object is to provide a novel and useful device combining strength and durability in construction with facility and completeness in operation.

The peculiar features and prominent advantages of the invention will be obvious by referring to the accompanying drawings, in which A represents the axle, united to the front cross-bar 2 by convergent side bars 3, which are also connected at suitable intervals by transverse bars 4 and 5. A vertically-swinging frame is composed of two horizontal bars 6 and depending bars 7 which are rigidly united at their junction and reinforced by diagonal braces 8. The forward extensions of the frame are pivoted in clips 9, attached to the front cross-bar. The depending bars 7 are connected near their upper ends by iron bars 9ª.

A rake-head 10, provided with horizontally-disposed teeth 11, has two encircling grooves, forming bearings which are journaled in the lower ends of the depending bars 7. The outer shoulders of each groove are provided with metal collars 12, having apertures to admit the lower ends of plungers 13, which slide in grooves formed in the outer sides of the depending bars. The said plungers are normally held in engagement with the rake-head by downwardly-bearing springs 14. It will be understood that when the rake is in operation it cannot accidentally revolve, and thereby prematurely dump its load.

A rock-shaft 15, journaled in bearings attached to the top of the axle, carries a short arm 16 and two longer arms 17, provided at their outer ends with antifriction-rollers, which engage two curved double levers 18, pivotally attached to the outer sides of the bars 6. The shorter arms of these levers are connected by rods 19 to angle-levers 20, which operate the plungers 13. A locking-lever 21 is connected by a rod 22 to the short arm 16 of the rock-shaft.

When in operation, the rake-head is locked and the teeth held in working position by the plungers. On arrival at the desired dumping-place the lever 21 is thrust forward, the action of the levers 17 and 18 raises the swinging frame, and the angle-levers 20 simultaneously lift the plungers 13, releasing the rake-head. The teeth being thus free to revolve are tripped and the load is dumped. The spurs 23 successively engage the surface of the ground, and the teeth being thus restored to their operative position the rake-head is re-locked by the plungers 13.

If it is desired to raise the rake, as shown in Fig. 3, either with the load on the rake or in traveling along a road, the pawl 24 is thrown into engagement with the lever 18, when the swinging frame will be raised by operating the hand-lever without releasing the catch 13.

What I claim as new is—

1. In a horse-rake, the combination with the main frame and axle, a vertically-swinging frame 6 having depending rear arms 7 provided with guideways, and plungers 13 working in said guideways, of a revolving rake-head 10 provided with recesses adapted to receive the lower ends of said plungers, fulcrumed bell-cranks having pivotal connections with the upper ends of said plungers, fulcrumed lifting-levers 18 having their upper arms jointedly connected with said bell-cranks and their lower rearwardly and downwardly extending arms contacting with the depending arms of said swinging frame, a pivoted operating-lever and means connected with the latter for exerting a lifting pressure on the under sides of the rearwardly-curved lower arms of the levers 18, substantially as specified.

2. In a horse-rake, the combination with the main frame and axle, of the vertically-swinging frame 6 having depending bars 7, a revoluble rake-head journaled in the lower ends of said depending bars, plungers 13 adapted to work in guides in said depending bars and to have their lower ends engage recesses in said rake-head, bell-crank levers 20 pivotally connected with the upper ends of said plungers, angular levers 18 fulcrumed to the upper arms of the frame 6, the lower rearwardly and downwardly extending curved arms of said levers 18 having contact with the depending bars 7 and a jointed connection with the bell-crank lever 20, an operating-lever 21 pivoted to the framework, a journaled rock-shaft 15, an arm 16 extending therefrom, a jointed connection between said arm 16 and operating-lever, arms 17 carried on said rock-shaft and adapted to engage the curved forward surfaces of the lower arms of the levers 18, substantially as specified.

In testimony that I claim the foregoing I have hereunto set my hand this 10th day of May, 1899.

JOHN H. LAWSON.

Witnesses:
EUGENE S. OWEN,
F. A. OWEN.